Sept. 15, 1936. R. L. WILLIAMS 2,054,109

INDICATING DEVICE

Original Filed Dec. 13, 1929

Inventor:
Robert L. Williams
by Ezekiel Wolf
his Attorney

Patented Sept. 15, 1936

2,054,109

UNITED STATES PATENT OFFICE 2,054,109

INDICATING DEVICE

Robert Longfellow Williams, Newton, Mass., assignor to Submarine Signal Company, Boston, Mass., a corporation of Maine Original application December 13, 1929, Serial No. 413,917. Divided and this application June 16, 1934, Serial No. 730,891

5 Claims. (Cl. 116—129)

This application is a division of my copending application Serial No. 413,917, Pat. No. 2,015,762 filed December 13, 1929.

The present invention relates to distance and depth measurement, and more particularly to the system, apparatus and methods employed in determining depths and heights by transmitting a sound or compressional wave signal and measuring the time interval between the emission of the sound and the receipt of the impulse reflected from the object whose distance is to be measured.

Various general types of systems and methods have been employed in measuring depths and distances in the manner above indicated,—some with more or less commercial success. In one system in particular, however, a rotatable indicator is set in motion when the original sound is transmitted and is stopped by a braking mechanism when the echo returns, the angle through which the indicator has rotated being a measure of the distance. Much difficulty has been encountered in effectively stopping the rotating member with the necessary precision when the echo returns. A still greater difficulty is that the initial signal has a tendency to act on the braking mechanism, thereby preventing any motion of the disc, and, of course, preventing a measurement. To avoid this it was found necessary carefully to shield the sound receiver from the direct signal.

The present invention completely eliminates these difficulties.

It has also been found in practice that a sharp sound impulse is well suited to depth sounding. Such an impulse has been produced by an explosion, or by an impact striker such as, for example, is shown in the copending application of Edwin E. Turner, Jr., Serial No. 270,660. The use of an explosive for this purpose is attended by a number of objections. The impact strikers employed in the prior art have required a comparatively large source of power for their operation.

The present invention contemplates the use of an impact striker operated by hand- or foot-power, thereby avoiding the disadvantages of the use of an explosive, and also avoiding the necessity for having a large source of power.

A further object of the present invention is to produce a depth sounding system, method and apparatus which will be efficient and accurate in operation, simple and cheap to manufacture.

Additional features of the invention will be disclosed in the description of the drawing, in which Figure 1 shows schematically an arrangement of the system employed in the present invention.

Figure 1:
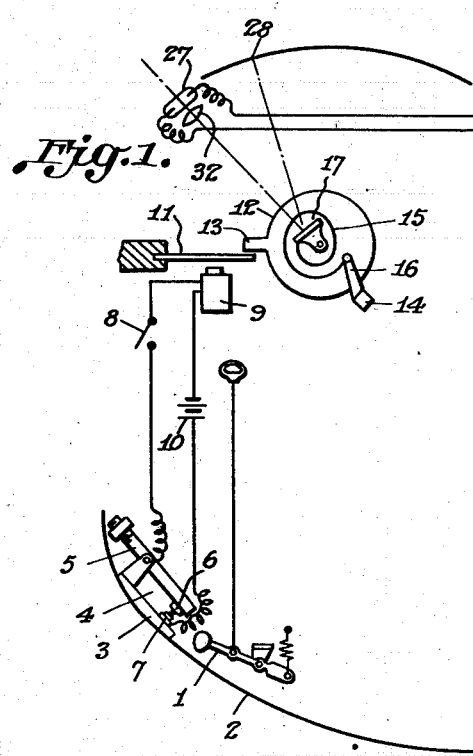

In Figure 1, I illustrates a manually operated impact striker which strikes against the ship's skin 2, sending out a sharp sound signal into the water.

The vibrations of the ship's skin caused by the blow of the striker 1 actuate the diaphragm 3 of the hydrophonic relay 4, thereby causing the pivoted arm 5 to move upwards, separating the contacts 6 and 7 which are in series with the switch 8, the electromagnet coil 9 and battery 10. The hydrophonic relay schematically shown in the drawing is similar to the apparatus described in my United States Patent No. 1,725,038 granted to me August 20, 1929.

When the switch 8 is closed, the electromagnet 9 is energized by current from the battery 10 through the closed contacts 6 and 7 producing a magnetic pull on spring armature 11. Upon the opening of contacts 6 and 7, the armature is released, thereby setting the inertia disc 12 in rotation. The disc can rotate until the arm 13 strikes stop 14.

To the axis of the disc is attached a coil spring 15 whose other end is fastened to an arm 16 mounted on the stop 14. When the disc rotates by virtue of the energy imparted to it by armature 11, it winds up the spring so that after arm 13 strikes stop 14 the spring returns the disc to its original position. Also mounted upon the disc and rotatable with it is mirror 17 whose function will be described below.

The sound impulse sent into the water by the striker 1 travels to the bottom and after reflection is received by the hydrophone 18 which may be mounted in a tank 19 filled with water. The hydrophone is energized by current from potentiometer 20 and battery 21. A switch 22 is provided to control the hydrophone current.

The sound impulse received by the hydrophone is translated into a corresponding electric impulse which is passed through transformer 23 and to the grid of detector tube 24, thereby producing a negative charge on the grid of tube 25 which cuts off the plate current flowing in the plate circuit of tube 25 through the primary of step-up transformer 26 and consequently induces a high potential in the secondary of the transformer causing a discharge of the indicator 27. Plate current is supplied to tube 25 when the switch 29 is closed.

The latter may be any form of indicator which will produce a luminous indication at the time of receipt of the echo, although it is preferred to use an electric discharge tube filled with gas such as neon.

After a negative charge has been placed on the grid of tube 25, resulting in the cutting off of the plate current of that tube, the charge on the grid immediately begins to leak off through resistance 31 shunted by condenser 30, thus restoring the grid to its normal potential, namely that of the negative side of the filament. The plate current flowing through the primary of transformer 26 is thus rapidly built up again, although not so rapidly as it is broken down when the echo is received. The time constant of the grid circuit of tube 25 is determined by the values of resistance 31 and condenser 30. This circuit is described in more detail in the United States Patent No. 1,775,073 granted to Edwin E. Turner, Jr., September 2, 1930.

Figure 2:
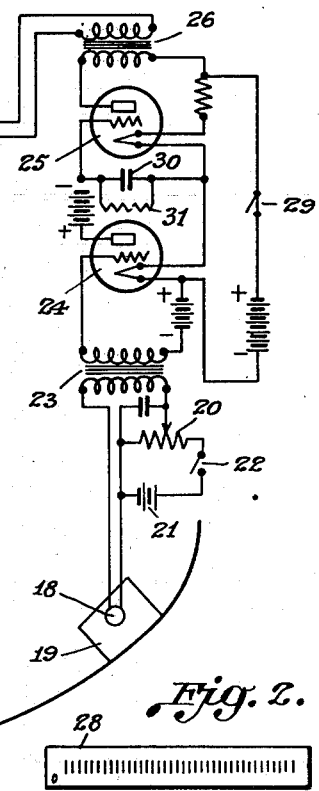
Figure 2 shows in elevation a front view of the scale shown in Figure 1.

During the time while the sound impulse has been traveling to the sea bottom and returning to the hydrophone, the inertia disc 12 carrying the mirror 17 has rotated through an angle determined by the depth being measured, the starting force applied by the armature 11 and the retarding force of the spring 15 being regarded as constants. The light emitted by the discharge of the indicator when the echo is received passes through the lens 32 and is reflected from the mirror 17 to a translucent scale 28 which may be graduated directly in terms of depth and is viewed by the observer from the convex side. The scale is shown in elevation in Fig. 2.

If the strength of the armature 11, the mass of the disc 12 and the tension of the spring 15 are properly chosen, the rate of angular motion of disc 12 can be made substantially uniform throughout its useful operating sector. Therefore, the angle through which the disc and mirror have moved during the time of travel of the sound impulse will be a measure of the depth. Likewise, the reflection of the luminous indicator at the moment of the receipt of the echo will, if the scale is properly calibrated, fall upon the scale at a point indicating the depth measured.

Figure 3:
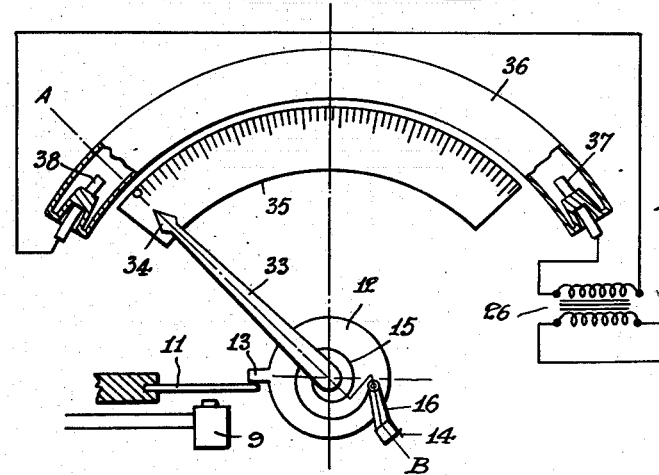
Figure 3 shows a modification of the system shown in Figure 1.
Figure 4:
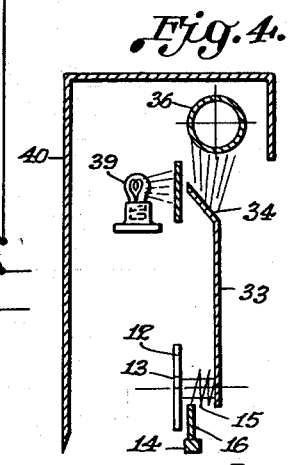
Figure 4 shows in section the apparatus illustrated in Figure 3.

Instead of determining the instantaneous position of the mirror when the echo is received by causing the mirror to reflect the light beam on a scale, the mirror may be arranged to reflect the light from the neon tube discharge directly to the eye of the observer who will note stroboscopically the instantaneous position of the mirror with respect to a scale when the discharge occurs. This modification of the invention is illustrated in Figures 3 and 4, the latter being a section along the line AB in Figure 3.

In this apparatus, the same type of signal sending and receiving apparatus may be employed as shown in Figure 1. Likewise, an inertia disc 12 is provided which is set in motion by the spring armature 11 when the signal is emitted and rotates against the action of the return spring 15 until the arm 13 strikes stop 14.

Mounted on the disc 12 and rotatable with it is an index 33 which travels in front of a scale 35. The latter may be translucent and illuminated from the rear by a source of light 39 to a sufficient brightness to enable an observer to read the graduations thereon.

Just above and in front of the scale is provided an electric discharge tube 36, which may be filled with a gas such as neon, and whose electrodes 37 and 38 are supplied with a discharge potential from transformer 26 when the echo is received, similarly as in Figure 1. The tube 36, however, is arcuate in shape and extends over the entire length of the scale. When the discharge occurs the light produced is reflected directly to the eye of the observer by a mirror mounted on the bent portion 34 of the index 33. Alternatively the bent portion 34 may be silvered or otherwise adapted to reflect light. The momentary position of the latter will thus appear to the observer as a bright spot of red light, if a neon tube is used, against the scale.

If the direct light from the discharge tube 36 be prevented from reaching the eye of the observer by a shield 40, shown in Figure 4, the index 1 will be substantially invisible except when illuminated by the discharge, thereby producing a remarkably effective indication.

While the system has been described as employing a hand- or foot-operated striker to send the initial signal, in order to simplify and to reduce the cost of the apparatus, it is, of course, evident that the indicating and time measuring apparatus described above will operate equally well with any other form of impact striker; e. g., that shown in the copending application of Edwin E. Turner, Jr., Serial No. 270,660, when an adequate source of electric power is available.

It will also be apparent to those skilled in the art that other modifications may be made without departing from the spirit and scope of the invention as set forth in the claims.

What is claimed is:

1. In an indicating device, a member provided with an arcuate scale, a pointer, a pivotal mounting for the pointer, the pointer having a free end portion bent backwards towards the scale and provided with a reflecting surface and an intermittently operated source of light arranged to illuminate the reflecting surface in all positions of the pointer, said member and said pointer being so arranged as to present the reflecting surface as an illuminated spot against the graduations of the scale.

2. In an indicating device, a member provided with a scale, a pointer, means for mounting the pointer to move over said scale, said pointer having a free end portion bent backwards towards the scale and providing a reflecting surface and an intermittently operated source of light arranged to illuminate the reflecting surface in all positions of the pointer, said member and said pointer being so arranged as to present the reflecting surface as an illuminated spot against the graduations of the scale.

3. In an indicating device provided with a scale, a pointer, means for moving the pointer over the scale, the pointer having a free end portion bent towards the scale and providing a reflecting surface and an intermittently operated source of light substantially extending the length of said scale and arranged to illuminate the reflecting surface in all positions of the pointer, the reflecting surface of said pointer being arranged with reference to the scale to make the spot of light appear against the graduations of the scale.

4. In an indicating device, a member provided with an arcuate scale, a pointer, a pivotal mounting for the pointer, the pointer having a free end portion bent towards the scale and provided with a reflecting surface and an arcuate neon light adapted to be operated intermittently to illuminate the reflecting surface in all positions of the pointer, the reflecting surface of said pointer being arranged with reference to the scale to make the spot of light appear against the graduations of the scale.

5. In an indicating device, a member provided with an arcuate scale, the said member being translucent and means providing a light source to illuminate said scale from the rear, a pointer and means mounting the pointer before the scale, said pointer having a portion inclined towards the scale and provided with a reflecting surface and an intermittently operated source of light arranged to illuminate the reflecting surface in all positions of the pointer, the reflecting surface of said pointer being arranged with reference to the scale to make the spot of light appear against the graduations of the scale.

ROBERT LONGFELLOW WILLIAMS.